(12) United States Patent
Biran et al.

(10) Patent No.: US 7,702,827 B2
(45) Date of Patent: Apr. 20, 2010

(54) SYSTEM AND METHOD FOR A CREDIT BASED FLOW DEVICE THAT UTILIZES PCI EXPRESS PACKETS HAVING MODIFIED HEADERS WHEREIN ID FIELDS INCLUDES NON-ID DATA

(75) Inventors: Giora Biran, Zichron Yaacov (IL); Ilya Granovsky, Haifa (IL); Elchanan Perlin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 11/771,304

(22) Filed: Jun. 29, 2007

(65) Prior Publication Data
US 2009/0006711 A1   Jan. 1, 2009

(51) Int. Cl.
*G06F 13/00* (2006.01)
(52) U.S. Cl. .............................. 710/30; 710/29; 710/31; 710/32; 710/33; 710/34; 710/266; 710/313; 710/316; 709/236
(58) Field of Classification Search ............. 710/29–34, 710/316, 268, 313, 266; 370/469, 370
See application file for complete search history.

(56) References Cited

U.S. PATENT DOCUMENTS

| 6,684,303 | B2 | 1/2004 | LaBerge |
| 7,043,667 | B2 | 5/2006 | Smith |
| 7,120,722 | B2 | 10/2006 | Sharma et al. |
| 7,315,911 | B2 * | 1/2008 | Davies et al. ............... 710/260 |
| 7,340,555 | B2 * | 3/2008 | Ashmore et al. ............ 710/313 |
| 7,478,178 | B2 * | 1/2009 | Torudbakken et al. ......... 710/31 |
| 7,536,495 | B2 * | 5/2009 | Ashmore et al. ............ 710/313 |
| 7,543,096 | B2 * | 6/2009 | Davies ........................ 710/268 |
| 2005/0147117 | A1 * | 7/2005 | Pettey et al. ................. 370/463 |
| 2005/0238038 | A1 * | 10/2005 | Keller et al. ................. 370/429 |
| 2006/0161707 | A1 | 7/2006 | Davies et al. |
| 2007/0147426 | A1 * | 6/2007 | Sharma et al. .............. 370/469 |

FOREIGN PATENT DOCUMENTS

WO   WO2005091156   9/2005

OTHER PUBLICATIONS

"IDT 89HPES24N3 PCI Express Switch." User Manual Table of Contents & Overview. Integrated Device Technology. Published:02/0812006.*
"PCI Express@ Base Specification", Revision 2.0, Dec. 20, 2006, Chapter 2, pp. 47-131.

* cited by examiner

*Primary Examiner*—Tammara Peyton
(74) *Attorney, Agent, or Firm*—Suzanne Erez

(57) ABSTRACT

Device, system, and method of utilizing PCI Express packets having modified headers. For example, an apparatus includes a credit-based flow control interconnect device to generate a credit-based flow control interconnect Transaction Layer Packet in which one or more bits of an ID field carry non-ID data.

19 Claims, 4 Drawing Sheets

SYSTEM AND METHOD FOR A CREDIT BASED FLOW DEVICE THAT UTILIZES PCI EXPRESS PACKETS HAVING MODIFIED HEADERS WHEREIN ID FIELDS INCLUDES NON-ID DATA

FIELD OF THE INVENTION

Some embodiments of the invention are related to the field of communication using Peripheral Component Interconnect (PCI) Express (PCIe).

BACKGROUND OF THE INVENTION

A computer system may include a PCI Express (PCIe) host able to connect between, for example, a processor and other units, e.g., a graphics card, a memory unit, or the like. PCIe is a high-speed serial Input/Output (I/O) protocol utilizing address-based and ID-based data routing. PCIe specifies a hierarchical topology, in which the PCIe host is located at a tree root, and multiple endpoints are attached to the PCIe host, directly and/or through one or more PCIe switches. A PCIe device is identified by a 16-bit ID, which includes a bus number (occupying 8 bits), a device number (occupying 5 bits), and a function number (occupying 3 bits).

PCIe communications utilize address-based routing for memory requests and for I/O requests, and utilize ID-based routing for configuration requests and for completion packets. Each PCIe Transaction Layer Packet (TLP) includes a Requestor ID field having a value which identifies the originator of the transaction. Additionally, a Completion TLP further includes a Completer ID field having a value which identifies the completer device.

SUMMARY OF THE INVENTION

Some embodiments of the invention include, for example, devices, systems and methods of utilizing PCI Express packets having modified headers.

Some embodiments include, for example, an apparatus including a credit-based flow control interconnect device to generate a credit-based flow control interconnect Transaction Layer Packet in which one or more bits of an ID field carry non-ID data.

In some embodiments, the Transaction Layer Packet is a Request Transaction Layer Packet, and the ID field is a Requestor ID field.

In some embodiments, the Transaction Layer Packet is a Completion Transaction Layer Packet, and the ID field is a Requestor ID field.

In some embodiments, the Transaction Layer Packet is a Completion Transaction Layer Packet, and the ID field is a Completer ID field.

In some embodiments, the credit-based flow control interconnect device is directly connected to a credit-based flow control interconnect host, and the credit-based flow control interconnect host is to capture device ID information of the credit-based flow control interconnect device.

In some embodiments, the credit-based flow control interconnect host is to transfer the Transaction Layer Packet to another credit-based flow control interconnect device based on the captured device ID information.

In some embodiments, the non-ID data includes application-specific data and/or status data and/or access key.

In some embodiments, the credit-based flow control interconnect device includes a PCI Express device, and the credit-based flow control interconnect Transaction Layer Packet includes a PCI Express Transaction Layer Packet.

In some embodiments, a method includes: creating a credit-based flow control interconnect Transaction Layer Packet in which one or more bits of an ID field carry non-ID data.

In some embodiments, the credit-based flow control interconnect Transaction Layer Packet is a PCI Express Transaction Layer Packet, and creating includes: storing the non-ID data in a Requestor ID field of a Request Transaction Layer Packet.

In some embodiments, the credit-based flow control interconnect Transaction Layer Packet is a PCI Express Transaction Layer Packet, and creating includes: storing the non-ID data in a Requestor ID field of a Completion Transaction Layer Packet.

In some embodiments, the credit-based flow control interconnect Transaction Layer Packet is a PCI Express Transaction Layer Packet, and creating includes: storing the non-ID data in a Completer ID field of a Completion Transaction Layer Packet.

In some embodiments, the method further includes: capturing device ID information of a credit-based flow control interconnect device; and based on the captured device ID information, transferring said Transaction Layer Packet to another credit-based flow control interconnect device.

In some embodiments, creating includes: storing in said ID field non-ID data, wherein the non-ID data is selected from a group consisting of: application-specific data, status data, and an access key.

In some embodiments, a system includes: a credit-based flow control interconnect device to generate a credit-based flow control interconnect Transaction Layer Packet in which one or more bits of an ID field carry non-ID data; and a credit-based flow control interconnect host to capture device ID information and to transfer said Transaction Layer Packet based on the captured device ID information.

In some embodiments, the system further includes: an additional credit-based flow control interconnect device to receive the Transaction Layer Packet and to read said non-ID data from said one or more bits of said ID field.

In some embodiments, the credit-based flow control interconnect device includes a PCI Express device, and wherein the credit-based flow control interconnect Transaction Layer Packet includes a PCI Express Transaction Layer Packet.

In some embodiments, the ID field includes at least one of: a Requestor ID field of a Request Transaction Layer Packet, a Requestor ID field of a Completion Transaction Layer Packet, and a Completion ID field of a Completion Transaction Layer Packet.

Some embodiments may include, for example, a computer program product including a computer-useable medium including a computer-readable program, wherein the computer-readable program when executed on a computer causes the computer to perform methods in accordance with some embodiments of the invention.

Some embodiments of the invention may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
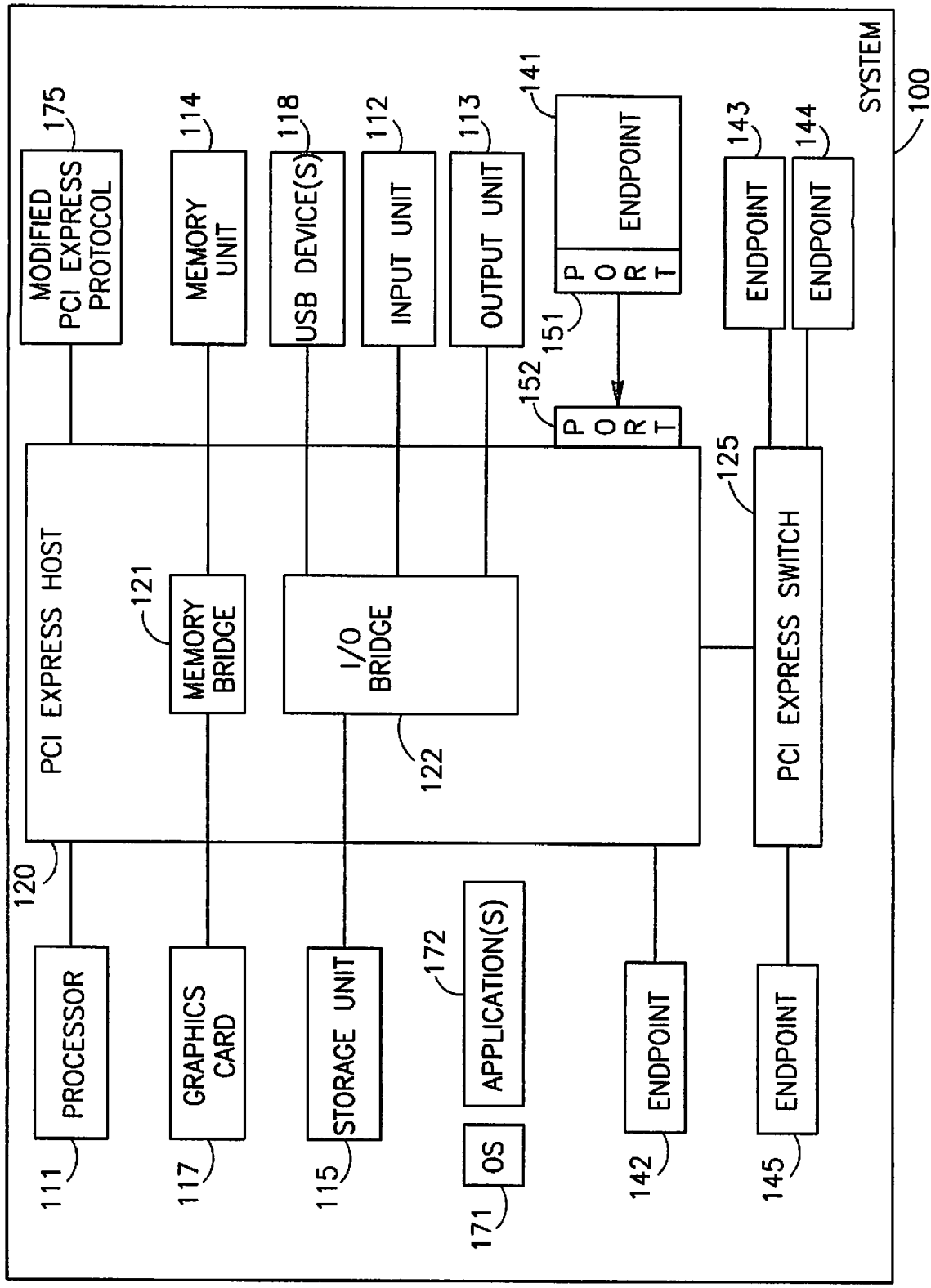
FIG. 1 is a schematic block diagram illustration of a system able to utilize PCIe packets having modified headers in accordance with a demonstrative embodiment of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein may include, for example, "multiple" or "two or more". For example, "a plurality of items" includes two or more items.

Although portions of the discussion herein may relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

The terms "Double Word" or "DWord" or "DW" as used herein may include, for example, a data unit having a size of four bytes.

The terms "sending device" or "sending endpoint" or "sending port" as used herein may include, for example, a PCIe device, a PCIe endpoint, a PCIe port, or other PCIe unit or PCIe-compatible unit able to send to transfer-out PCIe data.

The terms "receiving device" or "receiving endpoint" or "receiving port" as used herein may include, for example, a PCIe device, a PCIe endpoint, a PCIe port, or other PCIe unit or PCIe-compatible unit able to receive or transfer-in PCIe data.

The terms "non-ID data" or "alternate data" or "non-ID information" or "alternate information" as used herein may include, for example, data or information other than Requestor ID data; data or information other than Completer ID data; data or information other than Requestor ID data and other than Completer ID data; data or information which does not identify a Requestor device and/or does not identify a Completer device; application-specific data; information which is typically stored in a data portion of a conventional PCIe TLP; information which is not typically stored in a header of a PCIe TLP; application-specific data; data payload; control data; status data; keys; access keys; status data; extended status vectors; or the like.

Although portions of the discussion herein relate, for demonstrative purposes, to PCIe communications or devices, embodiments of the invention may be used with other types of communications or devices, for example, communications or devices utilizing transfer of packetized data over high-speed serial interconnects, communications or devices utilizing flow control-based link management, communications or devices utilizing credit-based flow control, communications or devices utilizing a fully-serial interface, communications or devices utilizing a split-transaction protocol implemented with attributed packets, communications or devices that prioritize packets for improved or optimal packet transfer, communications or devices utilizing scalable links having one or more lanes (e.g., point-to-point connections), communications or devices utilizing a high-speed serial interconnect, communications or devices utilizing differentiation of different traffic types, communications or devices utilizing a highly reliable data transfer mechanism (e.g., using sequence numbers and/or End-to-end Cyclic Redundancy Check (ECRC)), communications or devices utilizing a link layer to achieve integrity of transferred data, communications or devices utilizing a physical layer of two low-voltage differentially driven pairs of signals (e.g., a transmit pair and a receive pair), communications or devices utilizing link initialization including negotiation of lane widths and frequency of operation, communications or devices allowing to transmit a data packet only when it is known that a receiving buffer is available to receive the packet at the receiving side, communications or devices utilizing request packets and/or response packets, communications or devices utilizing Message Space and/or Message Signaled Interrupt (MSI) and/or in-band messages, communications or devices utilizing a software layer configuration space, communications or devices utilizing a Maximum Payload Size (MPS) parameter, or the like.

At an overview, some embodiments of the invention provide methods for efficient utilization or modified utilization (e.g., "relaxed usage" or "alternative usage") of one or more fields or field-spaces in a header of PCIe TLPs. In contrast with conventional PCIe TLPs, in which the header of substantially each TLP includes a Requestor ID field (e.g., occupying two bytes) having a value which identifies the originator of the transaction, and the header of substantially each Completion TLP includes both a Requestor ID field (e.g., occupying two bytes) and further includes a Completer ID field (e.g., occupying additional two bytes) having a value which identifies the completer device, some embodiments provide a modified utilization of the Requestor ID field and/or the Completer ID field, or a modified utilization of the space allocated to these PCIe TLP header fields.

In accordance with some embodiments, a PCIe hierarchy includes a PCIe host and one or more PCIe devices or endpoints attached to the PCIe host (e.g., directly, and not through a PCIe switch). In such PCIe systems, the PCIe device ID information is redundant, and PCIe communications are performed or handled by the PCIe host without utilizing ID information from the ID fields, since the routing is explicit (e.g., directly through the PCIe host). Accordingly, in some embodiments, storage resources, data transfer resources and/or processing resources associated with the ID information stored in the ID fields (namely, the Requestor ID and/or the Completer ID) are utilized for other purposes, e.g., to store and transfer non-ID information. For example, in some embodiments, the Requestor ID field and/or the Completer ID field of a PCIe TLP are used to store and/or transfer application-specific data.

In some embodiments, the space in the PCIe TLP header which corresponds to the Requestor ID field and/or the Completer ID field is utilized for storing other information (e.g., non-ID information), for example, application-specific data payload, control data, status data, keys, or the like. In other embodiments, the Requestor ID field and/or the Completer ID field are removed or omitted from the PCIe TLP header, and a reduced-size PCIe TLP header is used; for example, a reduced-size (e.g., two-DW) header is used in a Completion TLP, by omitting or removing the Requestor ID field and/or the Completer ID field from the TLP header.

FIG. 1 schematically illustrates a block diagram of a system 100 able to utilize PCIe packets having modified headers in accordance with some demonstrative embodiments of the invention. System 100 may be or may include, for example, a computing device, a computer, a Personal Computer (PC), a server computer, a client/server system, a mobile computer, a portable computer, a laptop computer, a notebook computer, a tablet computer, a network of multiple inter-connected devices, or the like.

System 100 may include, for example, a processor 111, an input unit 112, an output unit 113, a memory unit 114, a storage unit 115, a communication unit 116, and a graphics card 117. System 100 may optionally include other suitable hardware components and/or software components.

Processor 111 may include, for example, a Central Processing Unit (CPU), a Digital Signal Processor (DSP), a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 111 may execute instructions, for example, of an Operating System (OS) 171 of system 100 or of one or more software applications 172.

Input unit 112 may include, for example, a keyboard, a keypad, a mouse, a touch-pad, a stylus, a microphone, or other suitable pointing device or input device. Output unit 113 may include, for example, a cathode ray tube (CRT) monitor or display unit, a liquid crystal display (LCD) monitor or display unit, a screen, a monitor, a speaker, or other suitable display unit or output device. Graphics card 117 may include, for example, a graphics or video processor, adapter, controller or accelerator.

Memory unit 114 may include, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short term memory unit, a long term memory unit, or other suitable memory units or storage units. Storage unit 115 may include, for example, a hard disk drive, a floppy disk drive, a compact disk (CD) drive, a CD-ROM drive, a digital versatile disk (DVD) drive, or other suitable removable or non-removable storage units. Memory unit 114 and/or storage unit 115 may, for example, store data processed by system 100.

Communication unit 116 may include, for example, a wired or wireless network interface card (NIC), a wired or wireless modem, a wired or wireless receiver and/or transmitter, a wired or wireless transmitter-receiver and/or transceiver, a radio frequency (RF) communication unit or transceiver, or other units able to transmit and/or receive signals, blocks, frames, transmission streams, packets, messages and/or data. Communication unit 116 may optionally include, or may optionally be associated with, for example, one or more antennas, e.g., a dipole antenna, a monopole antenna, an omni-directional antenna, an end fed antenna, a circularly polarized antenna, a micro-strip antenna, a diversity antenna, or the like.

In some embodiments, the components of system 100 may be enclosed in, for example, a common housing, packaging, or the like, and may be interconnected or operably associated using one or more wired or wireless links. In other embodiments, for example, components of system 100 may be distributed among multiple or separate devices, may be implemented using a client/server configuration or system, may communicate using remote access methods, or the like.

System 100 may further include a PCIe host bridge 120 able to connect among multiple components of system 100, e.g., among multiple PCIe devices or PCIe endpoints. The PCIe host bridge 120 may include a memory bridge 121 or other memory controller, to which the memory unit 114 and/or the graphics card 117 may be connected. The PCIe host bridge 120 may further include an Input/Output (I/O) bridge 122, to which the input unit 112, the output unit 113, the storage unit 115, the communication unit 116, and one or more Universal Serial Bus (USB) devices 118 may be connected.

System 100 may further include a PCIe switch 125 able to interconnect among multiple PCIe devices or PCIe endpoints. In some embodiments, the PCIe switch 125 may be implemented as a separate or stand-alone unit or component; in other embodiments, the PCIe switch 125 may be integrated in, embedded with, or otherwise implemented using the PCIe host bridge 120 or other suitable component.

The topology or architecture of FIG. 1 are shown for demonstrative purposes, and embodiments of the invention may be used in conjunction with other suitable topologies or architectures. For example, in some embodiments, memory bridge 121 is implemented as a memory controller and is included or embedded in the PCIe host bridge 120. In some embodiments, a "north bridge" or a "south bridge" are used, and optionally include the PCIe host bridge 120 and/or a similar PCIe host component. In some embodiments, memory bridge 121 and PCIe host bridge 120 (and optionally the processor 111) are implemented using a single or common Integrated Circuit (IC), or using multiple ICs. Other suitable topologies or architectures may be used.

The PCIe host bridge 120 and/or the PCIe switch 125 may interconnect among multiple PCIe devices or endpoints, for example, endpoints 141-145. Some PCIe devices or endpoints (e.g., PCIe endpoints 141 and 142) are connected directly through the PCIe host bridge 120; whereas other PCIe endpoints (e.g., PCIe endpoints 143-145) are connected indirectly using the PCIe switch 125. Some embodiments allow or enable communications utilizing PCIe packets having modified headers only between (or among) PCIe devices or endpoints that are connected directly through the PCIe host bridge 120 (namely, only between endpoints 141 and 142); and disallow or disable communications utilizing PCIe packets having modified headers between (or among) PCIe devices or endpoints that are connected indirectly, or not connected directly through the PCIe host bridge 120, or connected indirectly through the PCIe switch 125 (namely, among endpoints 143-145, or between endpoint 141 and endpoints 143-145, or between endpoint 142 and endpoints 143-145).

The PCIe host bridge 120 and/or the PCIe switch 125 may interconnect among multiple PCIe endpoints or PCIe devices, for example, endpoints 141-145. For demonstrative purposes, PCIe endpoint 141 may send data to the memory bridge 121; accordingly, endpoint 141 is referred to herein as "sending endpoint" or "sending device", whereas the memory bridge 121 is referred to herein as "receiving endpoint" or "receiving device". Other components may operate as a sending device and/or as a receiving device. For example, processor 111 may be a sending device and memory unit 114 may be a receiving device; USB device 118 may be a sending device and storage unit 115 may be a receiving device; the memory bridge 121 may operate as a receiving device (e.g., vis-à-vis a first endpoint or component) and/or may operate as a sending device (e.g., vis-à-vis a second endpoint or component); or the like. In some embodiments, the receiving device may send back data or control data to the sending device, or vice versa; for example, the communication between the sending device and the receiving device may be unilateral or bilateral.

Optionally, the sending device may operate utilizing a device driver, and the receiving device may operate utilizing a device driver. In some embodiments, the device drivers, as well as PCIe host bridge 120, may support a modified PCIe protocol 175 in accordance with some embodiments of the invention. The modified PCIe protocol 175, for example, may define, instruct, allow or indicate that non-ID information may be stored or carried in one or more bits of ID field(s) of TLPs, or that one or more bits of ID field(s) of TLPs are allocated or re-allocated for storing or carrying non-ID information (e.g., instead of storing or carrying ID information).

In some embodiments, the sending device (connected directly to the PCIe host bridge 120) transfers data to the receiving device (connected directly to the PCIe host bridge 120) through the PCIe host bridge 120 using the modified PCIe protocol 175, namely, using PCIe packets (TLPs) having modified headers and/or reduced-size headers. The sending device is connected to (or includes) a PCIe port 151 (an "upstream port", or a "downstream-facing port"). The receiving device is connected to (or includes) a PCIe port 152, e.g., a PCIe port of the PCIe host bridge 120 (a "downstream port", or an "upstream-facing port").

In some embodiments, the upstream port 151 and/or the downstream port 152 may support, enable and/or perform ID emulation; replacement of ID fields of TLP headers with application-specific data; collection of application-specific data from ID fields of TLP headers; partial or complete removal or omission or replacement of the Requestor ID field from headers of Request TLPs; partial or complete removal or omission or replacement of the Requestor ID field and/or the Completer ID field from headers of Completion TLPs; partial or complete replacement of the Requestor ID field and/or the Completer ID field in headers of TLPs with application-specific data; and sending and/or receiving of modified TLP headers or reduced-size TLP headers.

If the upstream port 151 supports and enables ID emulation or ID fields replacement or ID fields removal, then the upstream port 151 may capture the device ID of the downstream PCIe device, namely, of the receiving device. If utilization of PCIe packets having modified headers is enabled, then the upstream port 141 replaces the ID field(s) (e.g., the Requestor ID field) of the header of a downstream-flowing Request TLP with alternate data (e.g., application-specific data); and indicates the presence of such alternate data in the Requestor ID field and/or the Completer ID field by setting the value of a pre-defined field or flag in the TLP header. The upstream port 141 further collects application-specific data from headers of upstream-flowing Request TLPs. Additionally, if reduced-size Completion headers (or modified Completion headers) are supported and enabled, the upstream port 151 removes the Requestor ID field and the Completer ID field from headers of Completion TLPs, thereby reducing the size of Completion headers, for example, to two DW. The reduced-size Completion header is identified or indicated, for example, using a pre-defined encoding or value included in the Type field of the Completion header. Similarly, the downstream device (namely, the receiving device) may utilize PCIe packets having modified headers (namely, utilizing ID fields for application-specific data, or utilizing reduced-size headers), if these features are supported and enabled in its configuration space.

Some embodiments include or define a configuration mechanism, for example, using PCIe configuration space capability structure registers, to support the modified PCIe protocol 175. For example, some embodiments utilize a "Requestor ID emulation capable" indication in the Device Capabilities 2 register (e.g., applicable only to root port devices with type-1 configuration header). Some embodiments utilize an "alternative ID fields use" indication in the Device Capabilities 2 register (e.g., applicable to root port devices and/or endpoint devices); a "reduced Completion header supported" indication in the Device Capabilities 2 register (e.g., applicable to root port devices and/or endpoint devices). Some embodiments utilize a "Requestor ID emulation" control bit or indication in the Device Control 2 register (e.g., applicable only to upstream devices with type-1 configuration header), to allow the downstream-facing port to capture the ID of the downstream device. Some embodiments utilize an "alternative ID fields use" control bit or indication in the Device Control 2 register (e.g., applicable to root port devices and/or endpoint devices), to allow application-specific use of the ID fields in TLP headers, indicated by a pre-defined field of flag in the TLP header; when the this indication or flag is cleared or reset, the upstream port 141 is required to place the correct ID values in the ID fields of TLP headers, and is required not to utilize the modified PCIe protocol 175. Some embodiments utilize a "reduced Completion header" control bit or indication in the Device Control 2 register (e.g., applicable to root port devices and/or endpoint devices). Other suitable registers and/or fields may be used; registers offsets and/or field mapping may be pre-defined in the modified PCIe protocol 175 or otherwise pre-defined in a particular implementation.

Some embodiments utilize an error handling mechanism associated with PCIe packets having modified headers or reduced-size headers. For example, a downstream device (e.g., port or endpoint) supporting Requestor ID emulation may handle and report errors in a way similar to conventional PCIe devices. Error messages sent upstream are associated with the downstream device ID, which is captured in the PCIe host bridge 120 and used by the PCIe host bridge 120 for error reporting.

Some embodiments support Multi Function (MF) devices. For example, to support a downstream MF device, the device is required to be able to identify the function associated with upstream-flowing Requests. In some embodiments, the function number is placed in byte 1 of the TLP header, for example, in the reserved bits 2:0 of byte 1 of the TLP header. In other embodiments, three of the function number fields of the Requestor ID fields maintain their original value, whereas the remaining 13 bits of the Requestor ID fields are available for application-specific data.

In some embodiments, space corresponding to ID fields of PCIe TLP headers (namely, the Requestor ID field and/or the Completer ID field) is used for one or more alternate purposes, for example, to store application-specific data, to store substantive data, to store control data, to store status data, to store extended status vectors in the TLP header, to store access key(s) in the TLP header, and/or for alternative flow control mechanisms.

Some embodiments utilize and/or modify PCIe definitions in order to achieve various advantages. For example, conventional PCIe defines utilization of Device ID (e.g., occupying 16 bits or two bytes) to identify the PCIe device that "owns" or initiates the transaction; in conventional PCIe, a header of a Request TLP includes a Requestor ID (e.g., occupying 16 bits or two bytes) to identify the requester; and in conventional PCIe, a header of a Completion TLP includes a Requestor ID (e.g., occupying 16 bits or two bytes) to identify the transaction "owner", as well as a Completer ID (e.g., occupying 16 bits or two bytes) to identify the data source. In some embodiments, the PCIe host bridge 120 is directly connected (e.g., not indirectly connected through a switch) to one or more PCIe devices, captures ID information of PCIe devices, and uses the captured ID information for further processing and handling, without including the ID information in the header of every TLP transferred over the PCIe link. The ID fields of TLP headers are used to store and transfer application-specific data without consuming data resources, for example, small payload transmissions, status indications, registers data, keys, or the like.

Some embodiments allow utilization of header space (e.g., two bytes or four bytes per TLP header) for application-specific tasks, instead of requiring that the application utilize data payload for such tasks. Therefore, some embodiments reduce application-specific data payload usage, which requires allocation of additional data buffers and/or associated credits, as well as introduces packet overhead of up to approximately 20 percent of theoretical link bandwidth (e.g., for short packets traffic). Embodiments of the invention may provide other advantages or benefits.

Figure 2A:
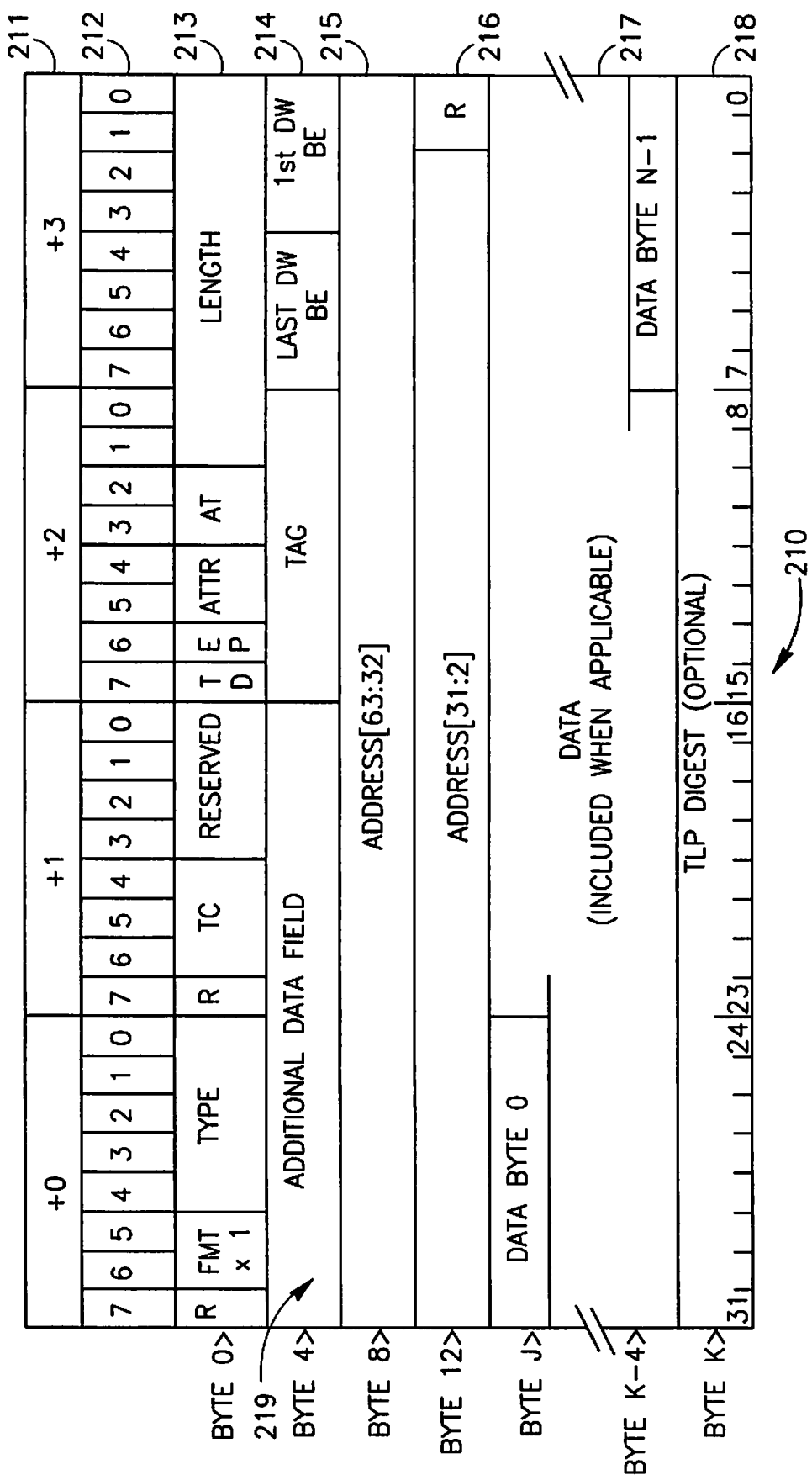
FIGS. 2A and 2B are schematic block diagram illustrations of structure of packets in accordance with a demonstrative embodiment of the invention.

Reference is made to FIG. 2A, which schematically illustrates a structure of a PCIe packet 210 in accordance with some demonstrative embodiments of the invention. Packet 210 is a four Double Word request TLP; a first row 211 indicates the byte offset (for example, +0, +1, +2 and +3); and a second row 212 indicates the bit count (for example, eight bits numbered from 0 to 7). Packet 210 includes fields of control information occupying eights bytes, as indicated in rows 213 and 214. Rows 215 and 216 include a request address, for example, a 64-bit request address having two reserved lower bits. Rows 213-216 correspond to the header of packet 210. Row 217 includes data, for example, application-specific data or payload data. Row 218 includes an optional TLP Digest. In some embodiments, packet 210 includes an additional data field 219, located in the header space corresponding to a Requestor ID field (namely, in row 214). The additional data field 219 does not store Requestor ID information, and instead stores other or alternate information, for example, application-specific data.

Figure 2B:
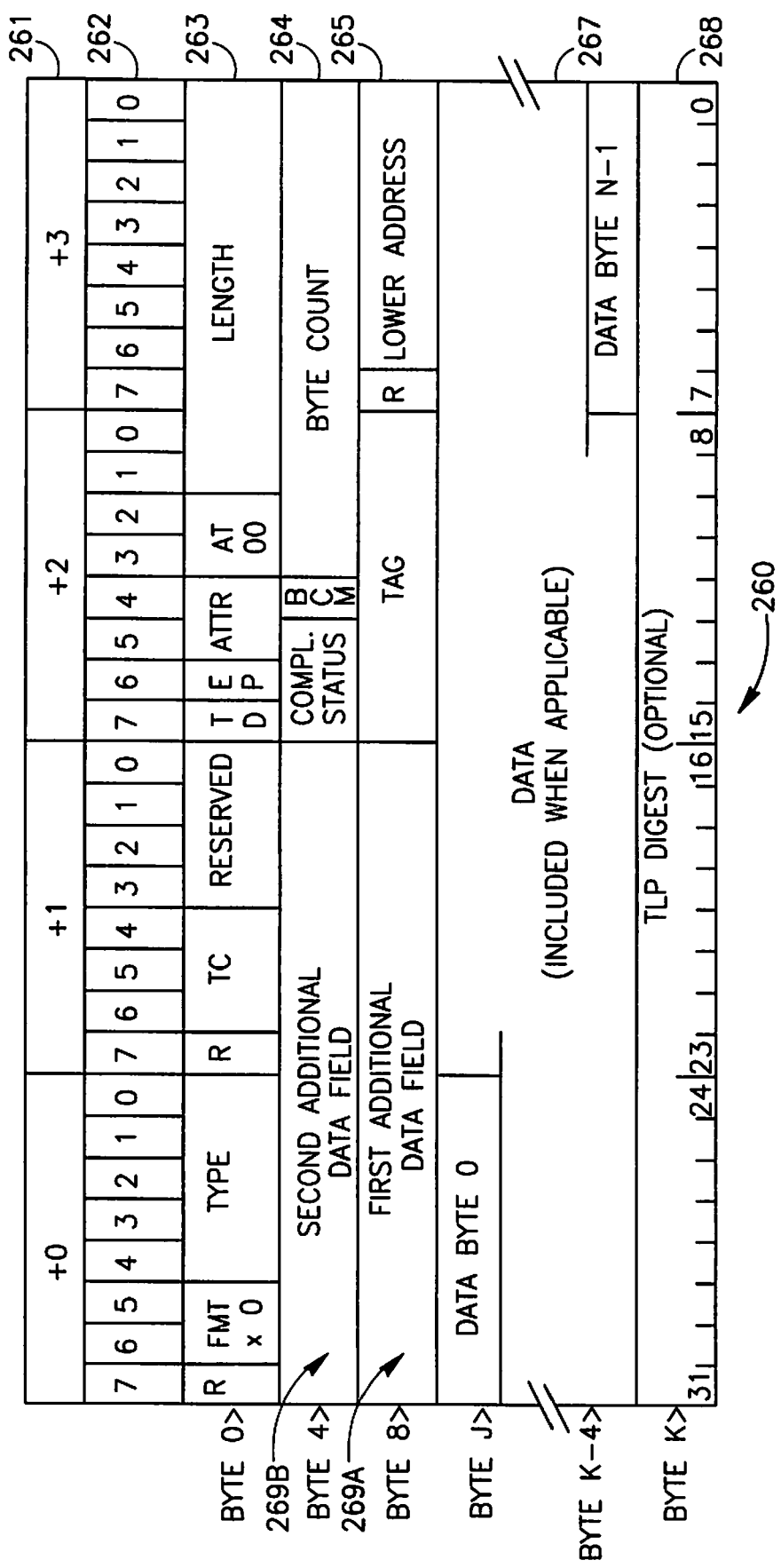

Reference is made to FIG. 2B, which schematically illustrates a structure of a packet 260 in accordance with some demonstrative embodiments of the invention. Packet 260 is a four Double Word completion TLP; a first row 261 indicates the byte offset (for example, +0, +1, +2 and +3); and a second row 262 indicates the bit count (for example, eight bits numbered from 0 to 7). Packet 260 includes fields of control information occupying twelve bytes, as indicated in rows 263-265. Rows 263-265 correspond to the header of packet 260. Row 267 includes data, for example, application-specific data or payload data. Row 268 includes an optional TLP Digest. In some embodiments, packet 260 includes a first additional data field 269A, located in the header space corresponding to a Requestor ID field (namely, in row 265). Additionally or alternatively, packet 260 includes a second additional data field 269B, located in the header space corresponding to a Completer ID field (namely, in row 264). The first additional data field 269A does not store Requestor ID information, and instead stores other or alternate information, for example, application-specific data. The second additional data field 269B does not store Completer ID information, and instead stores other or alternate information, for example, application-specific data.

Although FIGS. 2A and 2B show, for demonstrative purposes, packets and headers in which alternate data (e.g., application-specific data) is stored in header space corresponding to a Requestor ID field and/or corresponding to Completer ID field, embodiments of the invention are not limited in this regard. In some embodiments, one or more of the additional data fields 219, 269A and/or 269B may be omitted or removed from the TLP headers, such that the TLP headers have reduced-size. In other embodiments, one or more of the additional data fields 219, 269A and/or 269B may be regarded or handled as non-header fields or as fields storing (or able to store) application-specific data. Other header structures, TLP structures, field names, field functionalities and/or field ordering may be used in accordance with embodiments of the invention.

Figure 3:
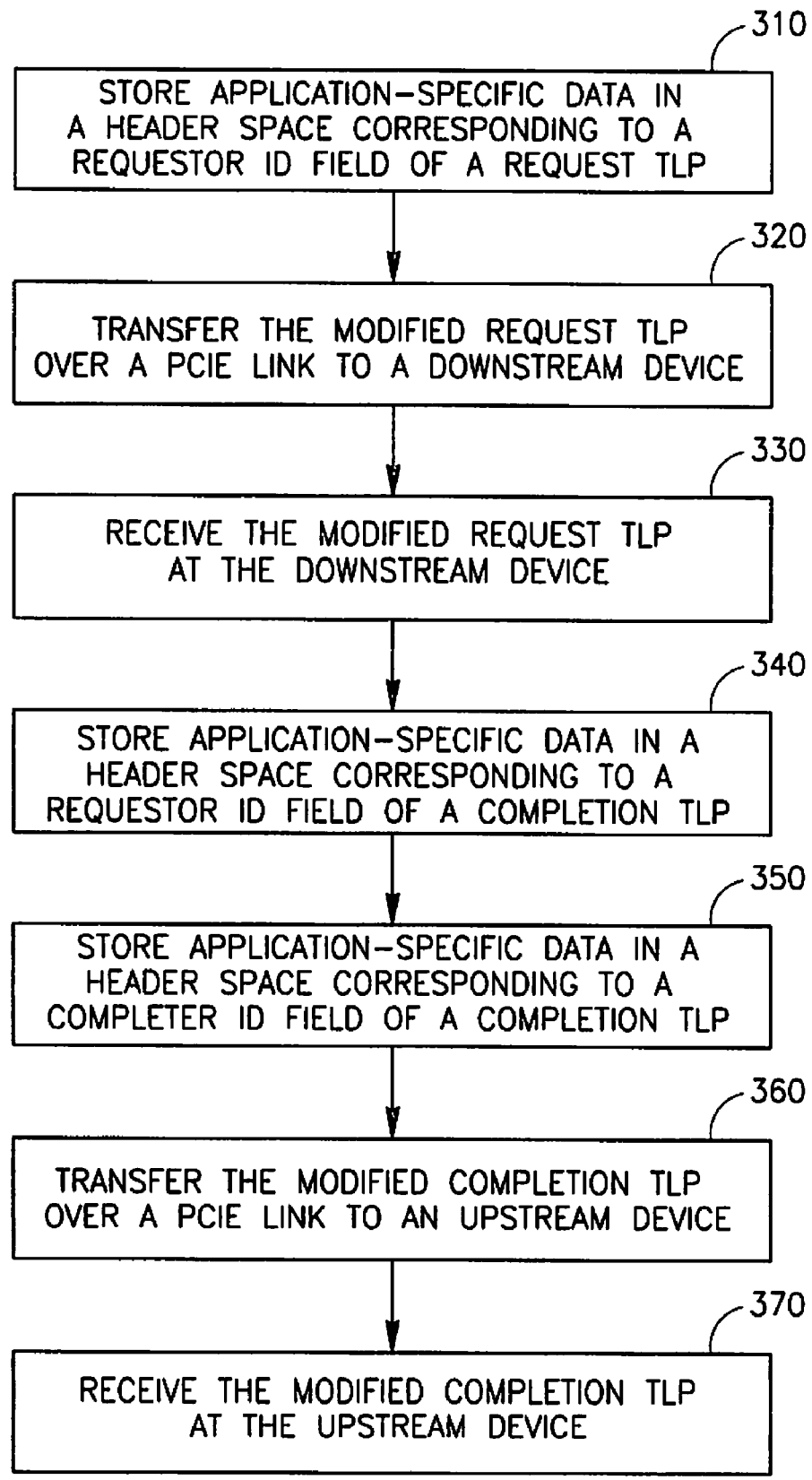
FIG. 3 is a schematic flow-chart of a method of utilizing PCIe packets having modified headers in accordance with a demonstrative embodiment of the invention.

FIG. 3 is a schematic flow-chart of a method of utilizing PCIe packets having modified headers in accordance with some demonstrative embodiments of the invention. Operations of the method may be used, for example, by system 100 of FIG. 1, and/or by other suitable units, devices and/or systems.

In some embodiments, the method may include, for example, storing application-specific data in a header space corresponding to a Requestor ID field of a Request TLP sent by a PCIe device connected directly to a PCIe host (block 310). This may be performed, for example, by an upstream port (a downstream-facing port) of a sending device or an upstream device. In some embodiments, the ID information of the ID field(s) may be replaced, over-written, re-allocated, or otherwise modified; in other embodiments, the ID field may be pre-defined or re-defined or otherwise allocated for storage or carrying of non-ID information. In some embodiments, TLPs may be generated and then modified; in other embodiments, TLPs need not be modified but rather may be originally generated or created according to the modified PCI Express protocol, e.g., to carry non-ID information in one or more bits of ID field(s).

The method may further include, for example, transferring the modified Request TLP (namely, the Request TLP having the modified header) over a PCIe link to the receiving device or a downstream device (block 320). This may be performed, for example, by the PCIe host, which may capture the device ID of the downstream device which is directly connected to the PCIe host.

The method may further include, for example, receiving the modified Request TLP at the downstream device (block 330).

The method may further include, for example, storing application-specific data in a header space corresponding to a Requestor ID field of a Completion TLP sent by the downstream device connected directly to a PCIe host (block 340). This may be performed, for example, by a downstream port (an upstream-facing port) of the downstream device.

The method may further include, for example, storing application-specific data in a header space corresponding to a Completer ID field of a Completion TLP sent by the downstream device connected directly to a PCIe host (block 350).

This may be performed, for example, by a downstream port (an upstream-facing port) of the downstream device.

The method may further include, for example, transferring the modified Completion TLP (namely, the Completion TLP having the modified header) over a PCIe link to the upstream device (block 360). This may be performed, for example, by the PCIe host, which may capture the device ID of the upstream device which is directly connected to the PCIe host.

The method may further include, for example, receiving the modified Completion TLP at the upstream device (block 370).

Other suitable operations or sets of operations may be used in accordance with embodiments of the invention.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus for utilizing Peripheral Component Interconnect (PCI) express packets having modified headers, said apparatus comprising:
   a credit-based flow control interconnect device to generate a credit-based flow control interconnect Transaction Layer Packet in which one or more bits of an ID field carry non-ID data,
   wherein the Transaction Layer Packet is selected from a packet group consisting of Request Transaction Layer Packets and Completion Transaction Layer Packets, and the ID field is selected from a field group consisting of Requestor ID fields and Completer ID fields.

2. The apparatus of claim 1, wherein the Transaction Layer Packet is a Request Transaction Layer Packet, and wherein the ID field is a Requestor ID field.

3. The apparatus of claim 1, wherein the Transaction Layer Packet is a Completion Transaction Layer Packet, and wherein the ID field is a Requestor ID field.

4. The apparatus of claim 1, wherein the Transaction Layer Packet is a Completion Transaction Layer Packet, and wherein the ID field is a Completer ID field.

5. The apparatus of claim 1, wherein the credit-based flow control interconnect device is directly connected to a credit-based flow control interconnect host, and wherein the credit-based flow control interconnect host is to capture device ID information of the credit-based flow control interconnect device.

6. The apparatus of claim 5, wherein the credit-based flow control interconnect host is to transfer the Transaction Layer Packet to another credit-based flow control interconnect device based on the captured device ID information.

7. The apparatus of claim 1, wherein the non-ID data comprises application-specific data.

8. The apparatus of claim 1, wherein the non-ID data comprises status data.

9. The apparatus of claim 1, wherein the non-ID data comprises an access key.

10. The apparatus of claim 1, wherein the credit-based flow control interconnect device comprises a PCI Express device, and wherein the credit-based flow control interconnect Transaction Layer Packet comprises a PCI Express Transaction Layer Packet.

11. A method for utilizing Peripheral Component Interconnect (PCI) express packets having modified headers, said method comprising:
    creating, using a credit-based flow control interconnect device, a credit-based flow control interconnect Transaction Layer Packet in which one or more bits of an ID field carry non-ID data,
    wherein the Transaction Layer Packet is selected from a packet group consisting of Request Transaction Layer Packets and Completion Transaction Layer Packets, and the ID field is selected from a field group consisting of Requestor ID fields and Completer ID fields.

12. The method of claim 11, wherein the credit-based flow control interconnect Transaction Layer Packet comprises a PCI Express Transaction Layer Packet, and wherein creating comprises:
    storing the non-ID data in a Requestor ID field of a Request Transaction Layer Packet.

13. The method of claim 11, wherein the credit-based flow control interconnect Transaction Layer Packet comprises a PCI Express Transaction Layer Packet, and wherein creating comprises:
    storing the non-ID data in a Requestor ID field of a Completion Transaction Layer Packet.

14. The method of claim 11, wherein the credit-based flow control interconnect Transaction Layer Packet comprises a PCI Express Transaction Layer Packet, and wherein creating comprises:
storing the non-ID data in a Completer ID field of a Completion Transaction Layer Packet.

15. The method of claim 11, further comprising:
capturing device ID information of a credit-based flow control interconnect device; and
based on the captured device ID information, transferring said Transaction Layer Packet to another credit-based flow control interconnect device.

16. The method of claim 11, wherein creating comprises:
storing in said ID field non-ID data, wherein the non-ID data is selected from a group consisting of: application-specific data, status data, and an access key.

17. A system for utilizing Peripheral Component Interconnect (PCI) express packets having modified headers, said system comprising:
a credit-based flow control interconnect device to generate a credit-based flow control interconnect Transaction Layer Packet in which one or more bits of an ID field carry non-ID data; and
a credit-based flow control interconnect host to capture device ID information and to transfer said Transaction Layer Packet based on the captured device ID information,
wherein the Transaction Layer Packet is selected from a packet group consisting of Request Transaction Layer Packets and Completion Transaction Layer Packets, and the ID field is selected from a field group consisting of Requestor ID fields and Completer ID fields.

18. The system of claim 17, further comprising:
an additional credit-based flow control interconnect device to receive the Transaction Layer Packet and to read said non-ID data from said one or more bits of said ID field.

19. The system of claim 17, wherein the credit-based flow control interconnect device comprises a PCI Express device, and wherein the credit-based flow control interconnect Transaction Layer Packet comprises a PCI Express Transaction Layer Packet.

* * * * *